United States Patent
Kattainen et al.

(10) Patent No.: US 11,383,957 B2
(45) Date of Patent: Jul. 12, 2022

(54) METHOD, ELEVATOR CONTROL UNIT AND ELEVATOR FOR MOVING AN ELEVATOR CAR TO LANDING FLOOR IN CASE OF EVENT RELATED TO MAIN ELECTRICAL POWER SUPPLY OF THE ELEVATOR

(71) Applicant: KONE Corporation, Helsinki (FI)

(72) Inventors: Ari Kattainen, Helsinki (FI); Pasi Raassina, Helsinki (FI); Juhamatti Nikander, Helsinki (FI); Ari-Pekka Lahtinen, Helsinki (FI); Pasi Rinnesaari, Helsinki (FI); Pasi Ahonen, Helsinki (FI)

(73) Assignee: KONE CORPORATION, Helsinki (FI)

(*) Notice: Subject to any disclaimer, the term of this patent is extended or adjusted under 35 U.S.C. 154(b) by 526 days.

(21) Appl. No.: 15/788,031

(22) Filed: Oct. 19, 2017

(65) Prior Publication Data
US 2018/0134519 A1    May 17, 2018

(30) Foreign Application Priority Data
Nov. 16, 2016  (EP) .................................. 16199088

(51) Int. Cl.
*B66B 1/32*     (2006.01)
*B66B 5/02*     (2006.01)
(Continued)

(52) U.S. Cl.
CPC ............... *B66B 5/027* (2013.01); *B66B 1/32* (2013.01); *B66B 5/0031* (2013.01); *B66B 9/00* (2013.01); *Y02B 50/00* (2013.01)

(58) Field of Classification Search
USPC ........................................................ 187/247
See application file for complete search history.

(56) References Cited

U.S. PATENT DOCUMENTS 4,240,527 A * 12/1980 Vine .......................... B66B 1/18
                                                    187/387
5,400,204 A *  3/1995 Oshima ................. B66B 5/0031
                                                    187/277
(Continued)

FOREIGN PATENT DOCUMENTS

CN        101434359 A     5/2009
CN        102804589 A    11/2012
(Continued)

OTHER PUBLICATIONS

European Search Report of application EP 16 19 9088, dated Apr. 26, 2017.

*Primary Examiner* — Christopher Uhlir
(74) *Attorney, Agent, or Firm* — Birch, Stewart, Kolasch & Birch, LLP (57) ABSTRACT

A method and an elevator for moving an elevator car to a landing floor in case of a predefined event related to a main electrical power supply of an elevator are disclosed. The method includes charging energy from the main electrical power supply into an external electrical energy storage prior to detecting the predefined event related to the main electrical power supply, controlling an operation of an electric motor for moving the elevator car with an electrical drive to decelerate the elevator car and to produce regenerative electrical energy, selectively utilizing said energy charged from the main electrical power supply into the external electrical energy storage and said produced regenerative electrical energy to maintain an elevator brake in deactivated state.

20 Claims, 7 Drawing Sheets

(51) Int. Cl.
*B66B 9/00* (2006.01)
*B66B 5/00* (2006.01)

(56) References Cited

U.S. PATENT DOCUMENTS

| | | | | |
|---|---|---|---|---|
| 6,533,074 | B2 * | 3/2003 | Tominaga | B66B 1/30 |
| | | | | 187/290 |
| 6,827,182 | B2 * | 12/2004 | Araki | B66B 5/027 |
| | | | | 187/290 |
| 2012/0085593 | A1 * | 4/2012 | Schoenauer | B66B 5/027 |
| | | | | 187/254 |
| 2015/0311814 | A1 * | 10/2015 | Stolt | H02M 5/4585 |
| | | | | 363/37 |

FOREIGN PATENT DOCUMENTS

| | | |
|---|---|---|
| CN | 104418192 A | 3/2015 |
| EP | 2 845 831 A1 | 3/2015 |

* cited by examiner

METHOD, ELEVATOR CONTROL UNIT AND ELEVATOR FOR MOVING AN ELEVATOR CAR TO LANDING FLOOR IN CASE OF EVENT RELATED TO MAIN ELECTRICAL POWER SUPPLY OF THE ELEVATOR

TECHNICAL FIELD

The invention concerns in general the technical field of elevators. The invention concerns especially methods for moving an elevator car to a landing floor in case of specific predefined events.

BACKGROUND

Typical elevators utilize electro-mechanical brakes, which are operated so that electrical power is supplied to energize an electromagnet which then deactivates the brake by applying a force via magnetic field. The deactivation of the brake consumes electrical energy. This typically happens when the elevator car of the elevator is moving or about to be moved. Less or no energy is consumed when the electromechanical brake is activated which happens so that, for example, a spring element pushes the brake into the activated state thus producing significant friction to decelerate, to stop or to keep the elevator car in its position.

Electrical power required for operating an elevator is typically drawn from an electrical power grid in connection with the elevator. In case of a failure in or loss of the electrical power grid, such as a loss-of-mains condition, causes the electromechanical brakes to activate due to loss of electrical power and to decelerate the elevator car rapidly.

The drawback of the prior art solutions is that in case of a failure or loss in the main electrical power supply of the elevator, the elevator brake is activated due to loss of electrical power of the elevator brake, which causes uncomfortable deceleration for passengers as well as typically leaves the elevator car between the landing floors of the elevator. Sudden activation of the elevator brake can also cause slipping in the elevator sheave. Thus, there is still a need to develop methods and systems to control the movement of the elevator car such that in case of power failure in or loss of main electrical power supply the elevator car does not decelerate too rapidly and moves to or at least towards a landing floor and at least in some conditions does not stop between landing floors leaving the passengers captive inside the elevator car. The methods and systems should also have minimum amount of extra electrical energy storage components and capacity in order not to increase the cost of the system significantly.

SUMMARY

The following presents a simplified summary in order to provide basic understanding of some aspects of various embodiments of the present invention. The summary is not an extensive overview of the invention. The following summary merely presents some concepts of the invention in a simplified form as a prelude to a more detailed description of exemplifying embodiments of the invention.

An objective of the present invention is to provide a method, elevator control units and elevators for moving an elevator car to a landing floor in case of a predefined event related to a main electrical power supply of the elevator. Another objective of the present invention is that the method, the elevator control units and the elevators at least lower the deceleration of the elevator car during said predefined event and preferably moves the elevator car at least towards the landing floor.

The objectives of the invention are reached by a method, an elevator control unit and an elevator as defined by the respective independent claims.

According to a first aspect, a method for moving an elevator car to a landing floor in case of a predefined event related to a main electrical power supply of an elevator is provided. The method comprises charging energy from the main electrical power supply into an external electrical energy storage prior to detecting the predefined event related to the main electrical power supply. The method also comprises controlling an operation of an electric motor for moving the elevator car with an electrical drive to decelerate the elevator car and to produce regenerative electrical energy. The method also comprises selectively utilizing said energy charged from the main electrical power supply into the external electrical energy storage and said produced regenerative electrical energy to maintain an elevator brake in deactivated state, i.e. not braking.

The predefined events related to the main electrical power supply refer herein to a failure in or loss of the main electrical power supply. The failure in or loss of the main electrical power supply may be a total blackout or a voltage sag or a voltage interruption.

The detecting may comprise monitoring a voltage of the main electrical power supply and comparing said voltage to a second threshold value to detect the predefined event.

The maintaining may comprise supplying electrical power from the external electrical energy storage or the electrical energy storage comprised in an intermediate circuit of the electrical drive to maintain the elevator brake in the deactivated state.

The controlling may comprise regulating a speed of the elevator car so as to move the elevator car to the landing floor.

The storing may comprise regulating a voltage of the electrical energy storage to a higher voltage than in normal operating conditions so as to store electrical energy to move the elevator car.

The normal operating conditions refer herein to conditions in which the elevator serves its landing floors in normal manner.

The method may further comprise regulating the voltage of the electrical energy storage to the higher voltage than in normal operating conditions in a glide mode so as to store electrical energy to move the elevator car.

The glide mode refers herein to an elevator mode of operation, for example, during a situation where there is a failure or loss of the main electrical power supply. This may be a total blackout or a voltage sag or a voltage interruption. During the glide mode kinetic and/or potential energy of the elevator car may be utilized to produce regenerative electrical energy with the electric motor.

The electrical energy storage for storing electrical energy to move the elevator car may be separate with respect to an energy storage element comprised in the electrical drive in which case the storing may comprise storing at least part of said regenerative electrical energy into said separate electrical energy storage.

The storing may comprise regulating a voltage of the electrical energy storage or said separate electrical energy storage to a higher voltage than the voltage of the electrical drive in normal operating conditions during at least part of a time period prior to the detecting the predefined event related to the main electrical power supply.

According to an embodiment of the present invention, a method for moving an elevator car to a landing floor in case of a predefined event related to a main electrical power supply of an elevator is provided. The method comprises detecting the predefined event related to the main electrical power supply. The method also comprises controlling an operation of an electric motor for moving the elevator car with an electrical drive to decelerate the elevator car and to produce regenerative electrical energy. The method also comprises storing at least part of said regenerative electrical energy into an intermediate circuit capacitor of the electrical drive. The method also comprises utilizing said regenerative energy charged into the intermediate circuit capacitor to maintain an elevator brake in deactivated state.

According to a second aspect, an elevator control unit for moving an elevator car to a landing floor in case of a predefined event related to a main electrical power supply of an elevator is provided. The elevator control unit comprises at least one processor, and at least one memory, volatile or non-volatile, storing at least one portion of computer program code, wherein the at least one processor is being configured to cause the elevator control unit at least to perform the following: charge energy from the main electrical power supply into an external electrical energy storage prior to detecting the predefined event related to the main electrical power supply, control an operation of an electric motor for moving the elevator car with an electrical drive to decelerate the elevator car and to produce regenerative electrical energy, selectively utilize said energy charged from the main electrical power supply into the external electrical energy storage and said produced regenerative electrical energy to maintain an elevator brake in deactivated state, i.e. not braking.

According to a third aspect, an elevator for moving an elevator car to a landing floor in case of a predefined event related to a main electrical power supply of the elevator is provided. The elevator comprises an electrical energy storage and an elevator control unit configured at least to: charge energy from the main electrical power supply into an external electrical energy storage prior to detecting the predefined event related to the main electrical power supply, control an operation of an electric motor for moving the elevator car with an electrical drive to decelerate the elevator car and to produce regenerative electrical energy, selectively utilize said energy charged from the main electrical power supply into the external electrical energy storage and said produced regenerative electrical energy to maintain an elevator brake in deactivated state, i.e. not braking. The elevator control unit, the electrical energy storage and the electrical drive are communicatively coupled to each other.

Furthermore, the elevator may comprise an electrical converter in electrical connection with the electrical drive and the electrical energy storage. The electrical converter may be utilized to regulate the voltage of the electrical energy storage.

The elevator may comprise the electrical converter supplying electrical energy to operate other components of the elevator needed for moving the elevator car to the landing floor in case of the predefined event.

The electrical converter may comprise a voltage step-up converter and a voltage step-down converter, and have a converter intermediate circuit comprising the electrical energy storage.

The voltage step-up converter and the voltage step-down converter may share an inductor as a common energy storage element in their main power circuits.

The method, elevator control units and elevators provide advantages over known solutions such that the deceleration of the elevator car may be controlled in order to at least lower the deceleration so that it does not become uncomfortable for the passengers inside the car. Utilization of the invention can prevent the elevator car from stopping between landing floors and thus may avoid from leaving the passengers captive inside the elevator car in case of the predefined event related to a main electrical power supply of an elevator.

Various other advantages will become clear to a skilled person based on the following detailed description.

The exemplary embodiments of the invention presented in this patent application are not to be interpreted to pose limitations to the applicability of the appended claims. The terms "first", "second", "third" do not denote any order, quantity, or importance, but rather are used to distinguish one element from another. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the present invention are illustrated by way of example, and not by way of limitation, in the figures of the accompanying drawings.

DESCRIPTION OF SOME EMBODIMENTS

Figure 1:
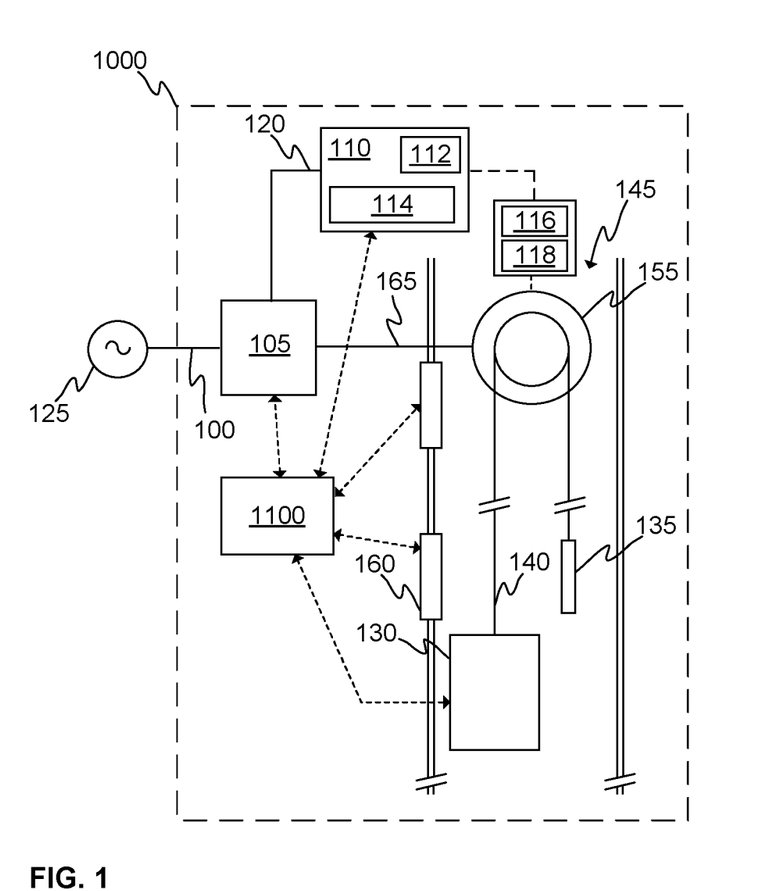
FIG. 1 illustrates schematically an elevator according to an embodiment of the present invention.

FIG. 1 illustrates schematically an elevator 1000 according to an embodiment of the present invention. The elevator 1000 may comprise an electric motor 155 for moving an elevator car 130 comprised in the elevator 1000. The elevator car 130 may be mechanically coupled to the electric motor 155, for example, by a hoisting rope 140, hydraulic means or in more direct manner in case of a linear motor. The operation of the electric motor 155 may be controlled by an electrical drive 105 such as a frequency converter or an inverter.

The hoisting rope 140 may comprise, for example, steel or carbon fibers. The term 'hoisting rope' does not limit the form of the element anyhow. For example, the hoisting rope 140 may be implemented as a rope 140, a belt, or a track in ropeless or rope-free elevators.

The elevator 1000 may comprise an elevator control unit 1100 for controlling the operation of the elevator 1000. The elevator control unit 1100 may be a separate device or may be comprised in the other components of the elevator 1000, such as in or as a part of the electrical drive 105. The elevator control unit 1100 may also be implemented in a distributed manner so that, e.g., one portion of the elevator control unit 1100 may be comprised in the electrical drive 105 and another portion in the elevator car 130. The elevator control unit 1100 may also be arranged in distributed manner at more than two locations or in more than two devices.

According to an embodiment of the present invention, different functions of the elevator 1000, such as controlling the electric motor 155 or the doors of the landing floors 160, may be implemented in different portions of the elevator control unit 1100, if there is more than one. One function may also be implemented in several portions of the elevator control unit 1100.

According to an embodiment of the present invention, the elevator 1000 may comprise an elevator brake 116, preferably, an electromechanical elevator brake 116. Preferably, there may also be a brake controller 118 for controlling the operation of the elevator brake 116, such as, to deactivate and/or activate the elevator brake 116. The brake(s) 116 may operate such as the magnetization of the coils of the brake(s) 116 deactivates the brake(s) 116 by force applied via magnetic field. The brake controller 118 may be integrated into the brake 116 or may be a separate brake controller device 118.

According to an embodiment of the present invention, the elevator 1000 may comprise an electrical energy storage arrangement 110 that may be connected to the electrical drive 105, for example, to an intermediate circuit of a frequency converter 105. The electrical energy storage arrangement 110 may comprise an electrical converter 112 for converting voltage and/or current to a suitable level to operate the electrical energy storage arrangement 110, particularly, in case of an external electrical energy storage 114, being external with respect to the electrical drive 105.

According to an embodiment of the present invention, the elevator 1000 may comprise an electrical energy storage 114, such as a capacitor or capacitor bank 114 or an battery 114, which may be used in both normal operating conditions and in emergency conditions of the elevator 1000, for example, to move the elevator car 130.

The normal operating conditions refer to conditions in which the elevator 1000 serves its landing floors 160 in normal manner. The emergency conditions refer to conditions in which there is, for example, a failure or loss of the main electrical power supply 125. As an example, typically, the normal operating conditions occur for a period of time prior to the emergency conditions. The failure or loss of the main electrical power supply 125 is one of the predefined events related to the main electrical power supply 125 as defined herein. This may be a total blackout or a voltage sag or a voltage interruption.

According to an embodiment of present invention, a function of the electrical energy storage 114 may be to supply electrical energy to the elevator brake(s) 116. In addition, the function of the electrical energy storage 114 may be to provide voltage supply for auxiliary control electronics, such as to the brake controller 118 or, for example, to an auxiliary electrical power supply or to some other components of the elevator 1000 shown in FIG. 1.

According to an embodiment of the present invention, the auxiliary control electronics may refer to auxiliary control circuits, e.g. control circuits required to keep the glide mode, described in more detail also hereinafter, operation ongoing. The control circuit may, for example, refer to drive control electronics (comprising, for example, digital signal processors etc.) and safety-related control circuits.

According to an embodiment of the present invention, the electrical energy storage 114 may be an external electrical energy storage 114, being external with respect to the electrical drive 105. The external electrical energy storage 114 may, however, be preferably at least in electrical connection with the intermediate circuit of the electrical drive 105.

According to preferred embodiment of the present invention, the external electrical energy storage 114 may comprise a separate, external energy storage element, such as a capacitor bank, with respect to the energy storage element of the electrical drive 105. According to the preferred embodiment of the present invention, the separate, external energy storage element may comprise a capacitor bank comprising electrolytic capacitor(s). Because these capacitor(s) are typically not charged/recharged frequently in the same manner as the intermediate circuit capacitors of the electrical drive 105, their lifetime may advantageously be higher. High lifetime is also an advantage when compared to alternative solutions for energy storage, such as lead acid batteries.

According to an embodiment of the present invention, the electrical energy storage may 114 be an intermediate circuit capacitor of the electrical drive 105. The electrical energy storage 114 may be an electrical energy storage element, such as a lithium ion battery and/or a capacitor, of the intermediate circuit of the electrical drive 105.

The electrical energy storage 114 may be connected to the intermediate circuit or the input circuit of the electrical drive 105, preferably, via the electrical converter 112 such as a voltage step-up converter. The electrical energy storage arrangement 110 may also comprise a brake controller 118 or a part of the elevator control unit 1100.

Other elements shown in FIG. 1, some of which may or may not be utilized in an embodiment of the present invention, are the main electrical power supply 125 such as a three- or single-phase electrical power grid, an electrical connection 120 of the electrical energy storage arrangement 110, if external with respect to the electrical drive 105, connection means 165 between the electrical drive 105 and the electric motor 155. The elevator car 130 may operate in a hoist-way 145 serving landing floors 160. There may or may not be a counter-weight 135 utilized in an embodiment of the present invention.

According to an embodiment of the present invention, the electric motor 155 may be a permanent magnet motor such as a surface-mounted or an interior permanent magnet motor. The electric motor 155 may be a linear, radial, axial, or transverse type of a motor. A rotor of the permanent magnet motor may have at least one permanent magnet providing magnetization of the rotor, i.e. excitation. In some embodiments, the electric motor 155 may be a synchronous motor comprising a magnetizing circuit or an exciter in connection with the rotor. According to another embodiment, the electric motor 155 may be an asynchronous electric motor such as an induction motor, or a doubly-fed induction motor or an asynchronous slip ring motor capable of being excited externally via the slip ring, for example, via brushes or wirelessly such as by induction. The excitation may be provided by, for example, a permanent magnet or a battery-operated exciter. The excitation may be based on injecting direct current (DC) into a magnetization circuit of the rotor, thus magnetizing the rotor. In various embodiments, the exciter may be at least partly coupled to the rotor.

According to an embodiment of the present invention, the elevator 1000 may have an auxiliary electrical power supply supplied by the electrical energy storage arrangement 110. The auxiliary electrical power supply may be utilized, for example, in the predefined events related to the main electrical power supply 125. The auxiliary electrical power supply may be used to feed power to operate the electrical drive 105 as well as other components required to be operable during certain events related to such as a failure in or a loss of the main electrical power supply 125. The other components required to be operable may be, for example, part of an elevator control system, such as the elevator control unit 1100, components of the elevator car 130, for example a door operator, the magnetizing circuit or the exciter of the electric motor 155, or elements of the elevator shaft 145 such as lighting. The auxiliary electrical power supply may also comprise a battery or battery bank.

According to an embodiment of the present invention, the elevator 1000 may comprise an auxiliary electrical power source such as an internal combustion engine, a fuel cell, a flywheel, or a lead, nickel-cadmium, nickel-metal hybrid, lithium ion, or lithium polymer battery delivering a voltage of 12 V, 24 V or 48 V, or at least a connection to such as a system or systems if not part of the elevator 1000. According to an embodiment of the present invention, the auxiliary electrical power source may be utilized to supply power to some of the components of the elevator 1000 such as a door operator of the elevator car 130 or a safety circuit of the elevator 1000.

Figure 2:
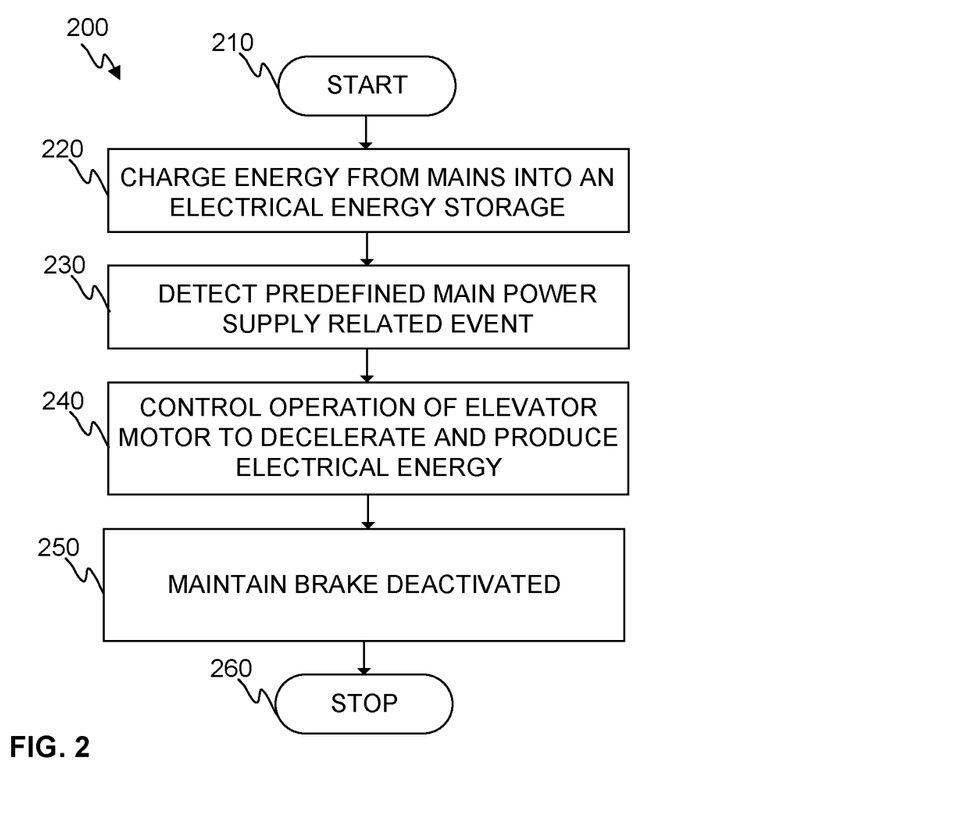
FIG. 2 illustrates a flow diagram disclosing an embodiment of a method in accordance with the present invention.

FIG. 2 illustrates, at 200, a flow diagram disclosing a method in accordance with an embodiment of the present invention.

Step 210 refers to a start-up phase of the method. Suitable equipment and components are obtained and systems assembled and configured for operation.

Step 220 refers to charging the electrical energy storage 114 with electrical energy from the main electrical power supply 125 prior to detecting a predefined event related to the main electrical power supply 125. According to various embodiments of the present invention, the electrical energy storage 114 may be an intermediate circuit capacitor of the electrical drive 105 or an external electrical energy storage 114.

Step 230 refers to detecting a predefined event related to the main electrical power supply 125.

According to an embodiment of the present invention, the detecting may comprise monitoring a voltage of the main electrical power supply 125 and comparing said voltage to a first threshold value to detect the predefined event. The first threshold value may be, for example, 85% of a phase voltage of an electrical power supply grid. Monitoring may be implemented by a voltage measurement. Measurement frequency may, advantageously, be 1000 Hz or higher yielding at most 1 millisecond delay. The detection may happen when the monitored voltage is lower than said threshold.

According to an embodiment of the present invention, the detecting comprises monitoring a voltage of an intermediate circuit voltage of the electrical drive 105 and comparing said voltage to a second threshold value to detect the predefined event. The second threshold value may be, for example, 70% of the voltage of the intermediate circuit, such as the voltage over the intermediate circuit capacitor, in the normal operating conditions. Monitoring may be implemented by a voltage measurement. Measurement frequency may, advantageously, be 1000 Hz or higher yielding at most 1 millisecond delay. The detection may happen when the monitored voltage is lower than said threshold.

According to an embodiment of the present invention, both the voltage of the main electrical power supply 125 and the voltage of an intermediate circuit 600 voltage may be monitored and compared to corresponding threshold values.

According to an embodiment of the present invention, the operation of the elevator 1000 may be configured to go into the glide mode which refers to a situation where there is a failure in or loss of the main electrical power supply 125. This may be a total blackout or a voltage sag or a voltage interruption. During the glide mode the elevator car 130, which was moving at the time the glide mode began, is still moving and kinetic and/or potential energy of the elevator car 130 may be utilized to produce regenerative electrical energy with the electric motor 155 by electrically braking the motor 155.

Step 240 refers to controlling the operation of an electric motor 155 by an electrical drive 105 to decelerate the elevator car 130 and to produce regenerative electrical energy.

According to an embodiment of the present invention, the controlling may be performed by controlling the torque of the electric motor 155 such as to decelerate the elevator car 130 faster than would happen due to natural acceleration, that is, due to friction and gravity, among others, and thus produce regenerative electrical energy, e.g., to decelerate the elevator car 130 with the motor 155.

Step 250 refers to maintaining an elevator brake 116 in a deactivated state by utilizing energy from the main electrical power supply 125 or regenerative electrical energy.

Method execution is ended at step 260. Operating the elevator 1000 or the elevator brake 116 utilizing stored energy in the electrical energy storage 114 is no longer needed or utilized.

According to an embodiment of the present invention, the electrical energy storage 114, such as comprised in the intermediate circuit of the electrical drive 105 or in the electrical energy storage arrangement 110, may, advantageously, be charged to a maximum, technically feasible voltage of the electrical energy storage 114.

Figure 3:
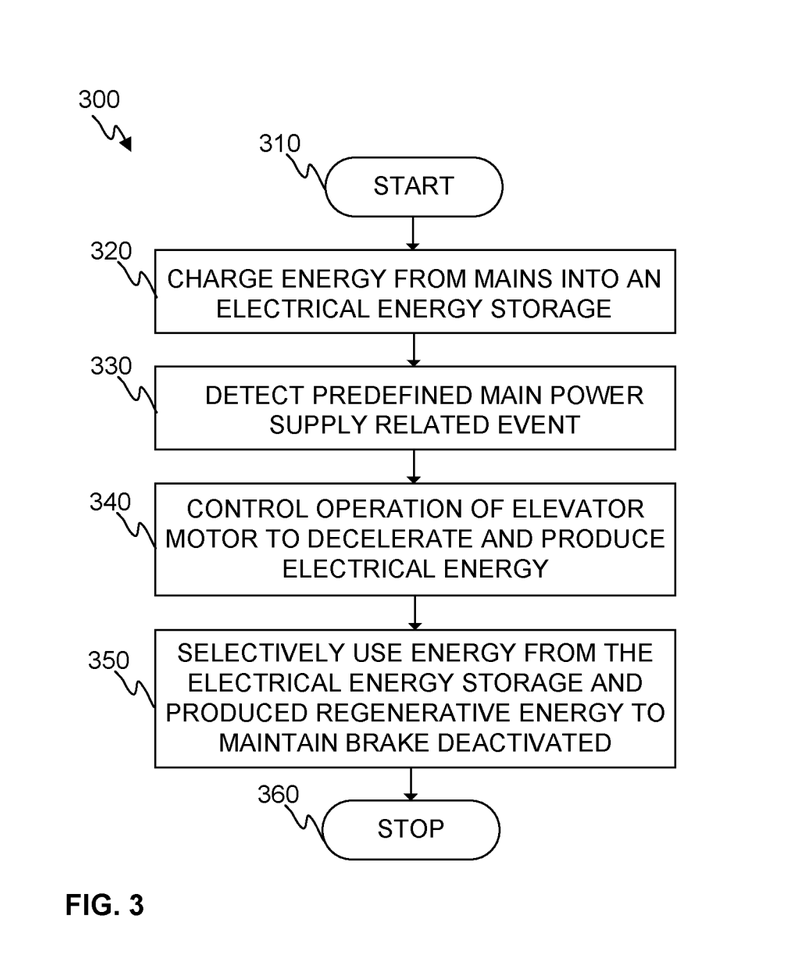
FIG. 3 illustrates a flow diagram disclosing an embodiment of a method in accordance with the present invention.

FIG. 3 illustrates, at 300, a flow diagram disclosing a method in accordance with an embodiment of the present invention.

Step 310 refers to a start-up phase of the method. Suitable equipment and components are obtained and systems assembled and configured for operation.

Step 320 refers to charging an external electrical energy storage 114, being external at least with respect to the electrical drive 105, with electrical energy from the main electrical power supply 125 prior to detecting a predefined event related to the main electrical power supply 125.

According to an embodiment of the present invention, the charging may comprise regulating a voltage of the electrical energy storage 114, i.e. in this case the external electrical energy storage 114, to a maximum technically feasible voltage value of the electrical energy storage 114, which may be, for example, 1000 V in case of a capacitor bank or 200 V in case of a battery or battery bank.

According to an embodiment of the present invention comprising the external electrical energy storage 114 separate from the electrical energy storage element comprised in the intermediate circuit 600 of the electrical drive 105, the voltage of said separate electrical energy storage 114 may, preferably, be higher than a voltage of the electrical drive 105, such as the voltage of the intermediate circuit 600, at least partly, or even always, during the normal operating conditions, such as typically prior to a predefined event related to the main electrical power supply 125.

Step 330 refers to detecting the predefined event related to the main electrical power supply 125, which may be performed, for example, as described in connection with FIG. 2, step 230.

Step 340 refers to controlling the operation of an electric motor 155 by an electrical drive 105 to decelerate the elevator car 130 and to produce regenerative electrical energy.

According to an embodiment of the present invention, the controlling may be performed by controlling the torque of the electric motor 155 such as to decelerate the elevator car 130 faster than would happen due to natural acceleration, that is, due to friction and gravity, among others, and thus produce regenerative electrical energy, e.g., to decelerate the elevator car 130 with the motor 155.

Step 350 refers to maintaining an elevator brake 116 in a deactivated state by utilizing energy from the main electrical power supply 125 or regenerative electrical energy. According to an embodiment of the present invention, the utilization may be selectively utilizing electrical energy from the main electrical power supply 125 and said regenerative electrical energy.

According to an embodiment of the present invention, the deactivation of the elevator brake 116 may be performed by utilizing only the electrical energy charged into the external electrical energy storage 114 prior to the detecting the predefined event related to the main electrical power supply 125, i.e., typically, during the normal operating conditions.

Method execution is ended at step 360. Operating the elevator 1000 or the elevator brake 116 is no longer needed or utilized.

Figure 4:
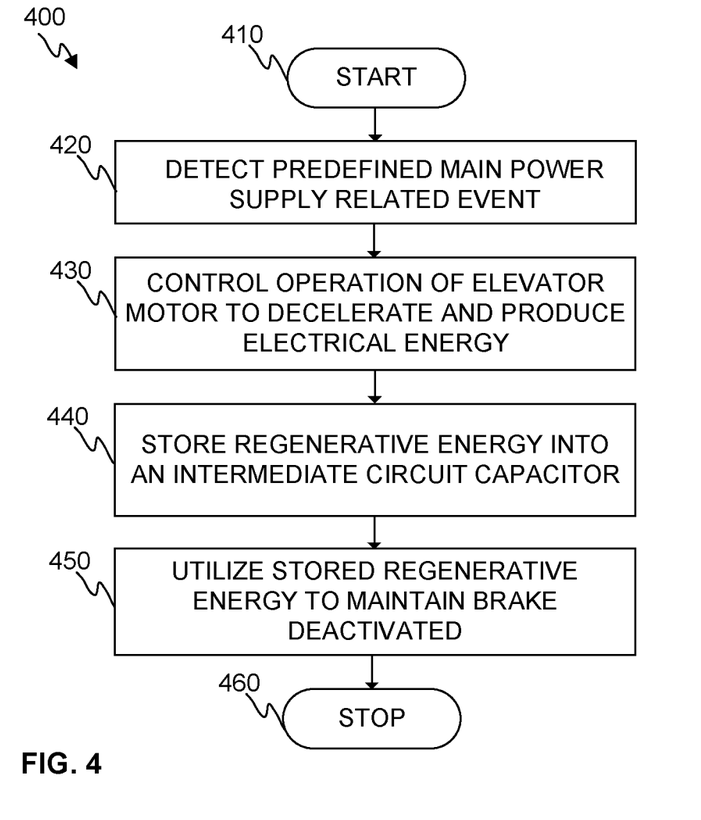
FIG. 4 illustrates a flow diagram disclosing an embodiment of a method in accordance with the present invention.

FIG. 4 illustrates, at 400, a flow diagram disclosing a method in accordance with an embodiment of the present invention.

Step 410 refers to a start-up phase of the method. Suitable equipment and components are obtained and systems assembled and configured for operation.

Step 420 refers to detecting a predefined event related to the main electrical power supply 125, which may be performed, for example, as described in connection with FIG. 2, step 230.

Step 430 refers to controlling the operation of an electric motor 155 by an electrical drive 105 to decelerate the elevator car 130 and to produce regenerative electrical energy.

According to an embodiment of the present invention, the controlling may be performed by controlling the torque of the electric motor 155 such as to decelerate the elevator car 130 faster than would happen due to natural acceleration, that is, due to friction and gravity, among others, and thus produce regenerative electrical energy, e.g., to decelerate the elevator car 130 with the motor 155.

Step 440 refers to storing or charging, at least part of, said regenerative electrical energy into an electrical energy storage 114 in electrical connection with the electrical drive 105, such as the intermediate circuit capacitor of the electrical drive 105. According to an embodiment, the electrical energy storage 114 may, preferably, be already charged during the normal operating conditions, i.e., for example prior to step 420, such that when, for example, a failure in or related to the main electrical power supply 125 begins, energy may be supplied from the already charged electrical energy storage 114.

According to an embodiment of the present invention, the storing comprises regulating a voltage of the electrical energy storage 114, i.e. in this case the intermediate circuit capacitor of the electrical drive 105, to a higher voltage than in normal operating conditions of the elevator 1000. The higher voltage than in the normal operating conditions may be at most a maximum technically feasible voltage value of the electrical energy storage 114, which may be, for example, 1000 V. The voltage of the electrical energy storage 114 in normal conditions may be, for example, 600 V in case of the electrical energy storage 114 comprised in the intermediate circuit 600 in order for the electrical drive 105 to produce current for the electric motor having substantially undistorted waveform, such as a pure sine wave. According to an embodiment of the present invention utilizing the voltage of the electrical energy storage in normal conditions of 600 V, the higher voltage than in normal operating conditions may be higher than 600 V, advantageously 700 V or 800 V in order to store electrical energy to be utilized in the glide mode.

Step 450 refers to maintaining an elevator brake 116 in a deactivated state by utilizing energy from the main electrical power supply 125 or regenerative electrical energy.

According to an embodiment of present invention, said utilizing comprising utilizing the regenerative energy charged into the intermediate circuit capacitor to maintain an elevator brake 116 in deactivated state, when no regenerative energy is produced by the electric motor.

Method execution is ended at step 460. Operating the elevator 1000 or the elevator brake 116 is no longer needed or utilized.

According to an embodiment of present invention, said regenerative electrical energy may be supplied directly from the intermediate circuit of the frequency converter 105 when regenerative electrical energy from the motor is available.

According to another embodiment of present invention, said regenerative electrical energy may be supplied from the electrical energy storage 114 when no braking power from the motor is available to maintain an elevator brake 116 in a deactivated state.

According to an embodiment of the present invention, the at least part of said regenerative electrical energy may be supplied to the elevator brake 116 through an electrical converter such as a voltage step-down or a buck converter.

The method according to the embodiments illustrated in FIGS. 2-4 may be performed by an elevator control unit 1100. According to an embodiment of the present invention, the method may be implemented at least partially with the electrical drive 105 or by an auxiliary controlling unit comprised in the elevator 1000. Furthermore, the method may be performed once, intermittently or continuously, depending on or relative to, for example, the operating conditions of the elevator 1000, such as the predefined events related to the main electrical power supply 125. This may entail performing the method, for example, continuously during the glide mode as long as there is energy available from the electrical energy storage 114 or as long as the elevator car 130 is moving and thus producing the regenerative power may be possible. The method may also be performed periodically or intermittently depending on the operating conditions of the elevator 1000.

According to an embodiment of the present invention, the method may be performed automatically or manually. The automatic performing may take place when the predefined event related to the main electrical power supply 125 has been detected. According to an embodiment of the present invention, the automatic performing of the method, which may entail automatically moving the elevator car 130 to a landing floor 160, may take place, for example, when the elevator 1000 goes into the glide mode. According to an advantageous scenario, the elevator car 130 may be moved to a landing floor 160 so as to release the passengers from the elevator car 130. This may also include opening the doors of the elevator car 130 once it has reached the landing 160 by utilizing energy from the electrical energy storage 114.

According to an embodiment of the present invention, the electrical drive 105 operating the electric motor 155 may be deactivated in order to reduce the power drawn from the electrical energy storage 114. The deactivation may refer to stopping the modulation, such as Pulse-Width Modulation, of the electrical drive 105.

According to an embodiment of the present invention, an operating condition of the elevator 1000 may be determined based on the mass and direction of movement of the elevator car 130. The mass may be determined, e.g., with a scale in the elevator car 130 or based on the input power of the elevator 1000 or the electric motor 155. The direction may be determined by measurement devices such as a direction sensor comprising, for example, magnets.

Some operating conditions of the elevator 1000 during the predefined events related to the main electrical power supply 125 may relate to situations as described below by way of example and not by way of limitation.

A first operating condition is such that the elevator car 130 is moving and the elevator brake 116 is deactivated. The moving in the first operating condition, which characteristics may depend on the balance/unbalance between the elevator car 130 and the counter-weight 135, if any, occurs in the direction where the elevator car 130 moves naturally due to gravity. The first operating condition occurs when the elevator car 130 is heavier than the counter-weight 135 and is moving downwards. The first operating condition occurs also when the elevator car 130 is lighter than the counter-weight 135 and is moving upwards.

A second operating condition is such that the elevator car 130 is moving and the elevator brake 116 is deactivated. The moving in the second operating condition, which characteristics may depend on the balance/unbalance between the elevator car 130 and the counter-weight 135, if any, is in the opposite direction compared to the direction where the elevator car 130 moves naturally due to gravity. The second operating condition occurs when the elevator car 130 is heavier than the counter-weight 135 and is moving upwards. The second operating condition occurs also when the elevator car 130 is lighter than the counter-weight 135 and is moving downwards.

A third operating condition is such that the weight of the elevator car 130 plus load of the car 130 is substantially balanced with the counter-weight 135, such that the elevator car 130 does not move from standstill when brakes are opened. In this operating condition, it may happen that the elevator car 130 does not reach the landing in the glide mode but stops in the shaft outside the landing. To recover from this non-desired condition, according to a specific embodiment, the external electrical energy storage 114 may be utilized by additionally configuring the system to supply energy from the external electrical energy storage 114 to the electric motor 155. In this specific balanced condition the energy required to move elevator car 130 may however be very small, such that the size/capacity of the external electrical energy storage 114 may not need to be very high, advantageously not higher than would otherwise be needed in some other embodiments of the present invention as described herein.

A fourth operating condition is such that the elevator car 130 is stopped and the elevator brake 116 is activated. In the fourth operating condition, the elevator brake 116, in case of a typical electromechanical brake, does not consume electrical power for braking.

According to a first scenario, the elevator car 130 is moving as described with respect to the first operating condition. At a time instance, there is a power failure in the main electrical power supply 125 and thus electrical power from the main electrical power supply 125 to the elevator 1000 drops to zero. The speed of the elevator car 130 begins to increase during this first time period, which started at the time instance and in practice may or may not exist or may be very short, and the energy may be supplied from the external electrical energy storage 114 or from the intermediate circuit capacitor(s) of the electrical drive to maintain the brake deactivated, which, the external electrical energy storage 114 or the intermediate circuit capacitor(s) of the electrical drive, was already charged prior to detecting the power failure, i.e. typically during normal operating conditions. The first time period ends when electrical drive starts to decelerate the electric motor 155, feeding electrical regenerative energy from motor 155 to DC intermediate circuit of the drive 105 and, optionally, also to the external electrical energy storage 114. This energy may then be supplied, for example, to the auxiliary control circuits and to the brake controller 118, and through the brake controller 118 further to magnetize coils of the brake(s) 116 to deactivate the brake(s) 116, so that it may not be necessary to discharge energy from the external electrical energy storage 114.

After the detection of the predefined event related to the main electrical power supply 125, the generation of the regenerative energy may be performed by applying a torque to the electric motor 155 by the electrical drive 105 to electrically decelerate the elevator car 130 such that regenerative electrical power is being generated by the electric motor 155.

According to a second scenario, the amount of available electrical energy stored in the electrical energy storage 114 may be determined to be too low, i.e. an insufficiency of the stored energy, to move the elevator car 130 to a landing floor 160 in the direction whereto the elevator car 130 is currently moving. Decisive factors may be the kinetic energy of the elevator car 130, friction, elevator car balancing, including the load of the car 130, when determining whether it is possible to move the elevator car 130 to a landing. In the particular second scenario, the direction of the movement of the elevator car 130 may be reversed by the available electrical energy stored in the electrical energy storage 114 by keeping the brakes deactivated and, thus, allowing the elevator car 130 to move or glide to another landing floor, preferably in the direction where the elevator car 130 will naturally move due to a gravity. The need for reversing the direction may occur in the second operation condition. This means that the elevator car 130 is moved by means of gravity, e.g., no power needs to be fed from the electrical energy storage 114 to operate the electric motor 155 but only to the brake(s) and auxiliary control circuits. Therefore, advantageously, only a small energy storage capacity may be needed.

According to a third scenario, if the elevator car 130 direction changes in the glide mode, and when the car 130 speed is very low in connection with the direction change, and thus regenerative power is not available, electrical power may be supplied from the electrical energy storage 114 to auxiliary control circuits and brakes. After the direction has changed car speed increases again and regenerative energy from motor may be utilized again and there may, advantageously, be no need to discharge the electrical energy storage 114 any more to move, or even accelerate, the elevator car 130 towards a landing floor 160.

According to an embodiment of the present invention, the insufficiency of the stored energy may be predicted by determining the required energy for moving the elevator car 130 to a landing floor 160 and comparing the determined required energy to the amount of available energy stored in the electrical energy storage 114, for example, based on the determined state-of-charge or a voltage level of the electrical energy storage 114. If the insufficiency of the stored energy is predicted, the electrical energy storage 114 may be charged during the glide mode with the regenerative electrical energy from the electric motor 155. The charged regenerative electrical energy may then be utilized to keep the brakes deactivated to allow reversing the direction of the movement of the elevator car 130 and move the elevator car 130 to a landing floor 160. Preferably, the electrical energy storage may already be charged prior to the predefined event related to the main electrical power supply 125 or before the glide mode is being initiated.

Figure 5A:
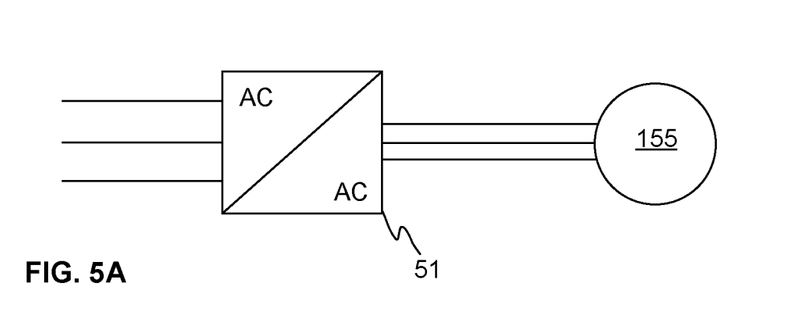
FIGS. 5A and 5B illustrate two examples of the electrical drive in accordance with an embodiment of the present invention.
Figure 5B:
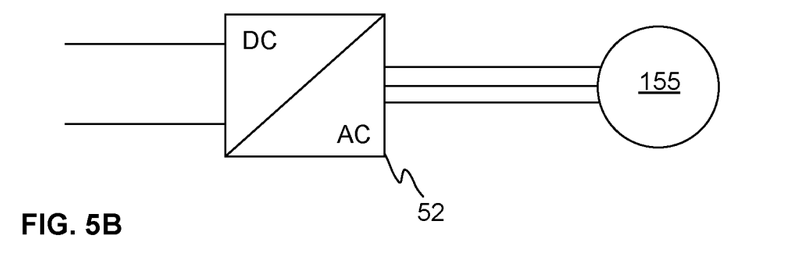

FIGS. 5A and 5B illustrate two examples of the electrical drive 105 in accordance with embodiments of the present invention. In FIG. 5A, the electrical drive 105 may be a frequency converter 51 which input may be connected to the main electrical power supply 125, in this case a three-phase electrical grid, and its output to the electric motor 155 of the elevator 1000.

The frequency converter 51 may be capable of converting, for example, a voltage or a current having a first frequency to a voltage with a second frequency which is the same or different with respect to the first frequency. According to an embodiment, the frequency converter 51 may comprise a rectifier with a switch and capable of operating in one or more quadrants, and an inverter 52 with a switch and capable of operating in one or more quadrants. The rectifier may be capable of converting the alternating current (AC) voltages and AC currents of the main electrical power supply 125 into DC voltages and DC currents, respectively. The frequency converter 51 may also comprise an inverter 52 capable of converting the DC voltages or currents into AC voltages or currents, respectively, thus controlling the operation of the electric motor 155, and capable of operating in one or more quadrants. There may also be an intermediate circuit connected between the rectifier and the inverter 52. The intermediate circuit may comprise an electrical storage element such as a capacitor or an inductor for smoothing DC voltage or current.

Figure 6A:
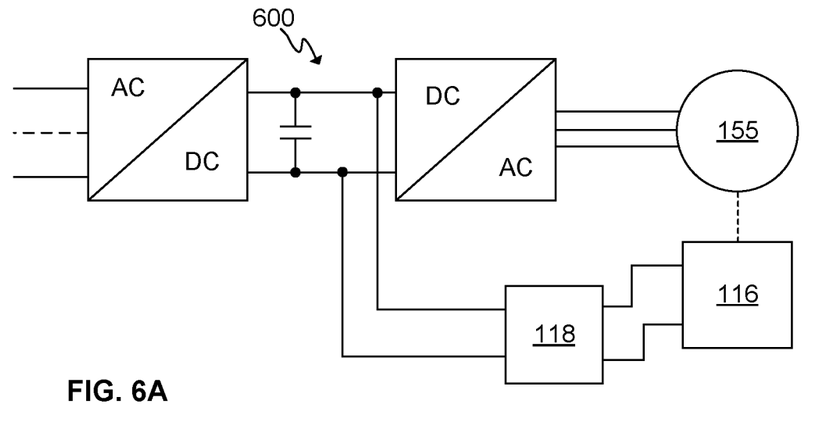
FIGS. 6A-6C illustrate schematically arrangements for operating the elevator brake according to embodiments of the present invention.
Figure 6B:
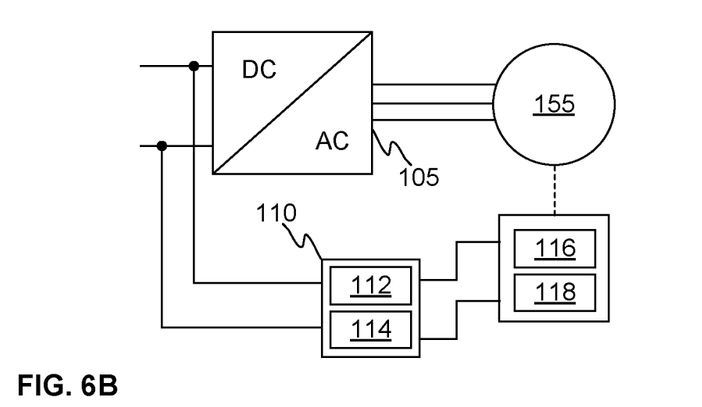
Figure 6C:
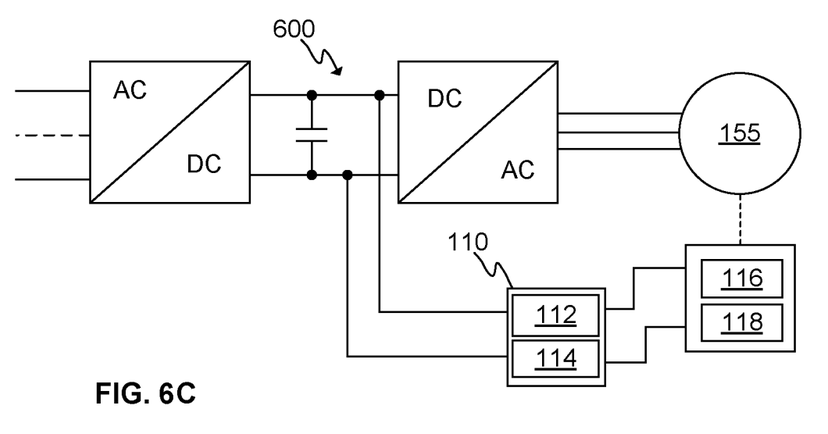

FIGS. 6A-6C illustrate schematically arrangements for operating the elevator brake 116 in accordance with embodiments of the present invention.

FIG. 6A illustrates an electrical drive 105 comprising an intermediate circuit 600 having an energy storage element, i.e. a capacitor, which may be used as an electrical energy storage 114. The elevator brake 116 may be operated from the intermediate circuit 600 through a brake controller 118.

FIG. 6B illustrates an electrical drive 105, either an intermediate circuit 600 of a frequency converter 51 or an input circuit of an inverter 52. The intermediate circuit 600 or the input circuit may or may not comprise an energy storage element for smoothing voltage or current.

According to the embodiment in FIG. 6B, the electrical connection 120 of the electrical energy storage arrangement 110 may be connected to the intermediate circuit 600 or the input circuit of the electrical drive 105. FIG. 6C illustrates a frequency converter 51 having an intermediate circuit 600 from which electrical power may be supplied for the electrical energy storage arrangement 110. According to an embodiment, the electrical converter 112 supplies power to the elevator brake 116, e.g. to a magnetization coil of the brake 116, through the brake controller 118. The brake controller 118 may comprise electrical devices, electrical circuit and/or processing units in order to convert the voltage and/or current to be suitable for operating the brake 116.

According to an embodiment of the present invention, the electrical energy storage arrangement 110 comprises an electrical converter 112 capable of stepping up the voltage of the intermediate circuit 600 or the input circuit of the inverter 52 to a level suitable for the electrical energy storage 114 of the electrical energy storage arrangement 110. The voltage level of the electrical energy storage 114 may be, for example, from about 600 V to about 1000 V, advantageously from about 600 V to about 800 V. According to another embodiment, the electrical energy storage arrangement 110 comprises another electrical converter capable of stepping down the voltage of the electrical energy storage 114 of the electrical energy storage arrangement 110 to a level suitable for the elevator brake 116 or the brake controller 118. According to an embodiment, the suitable level may be about 100 V to about 200 V.

According to an embodiment of the present invention, the elevator control unit 1100 may monitor the voltage of the electrical energy storage 114. According to an embodiment of the present invention, the elevator control unit 1100 may monitor the condition and/or state-of-charge of the electrical energy storage 114 of the electrical energy storage arrangement 110.

According to an embodiment of the present invention, the electrical energy storage arrangement 110 may comprise a functionality to monitor and prevent the state-of-charge or the voltage of the electrical energy storage 114 to become too low. According to an embodiment of the present invention, a state-of-charge threshold may be 10, 20, 30, 40 or 50% for said too low state-of-charge. The electrical energy storage arrangement 110 may also be configured to prevent the electrical converters 112 of the electrical energy storage arrangement 110 to cause short-circuit for the electrical energy storage 114.

Figure 7A:
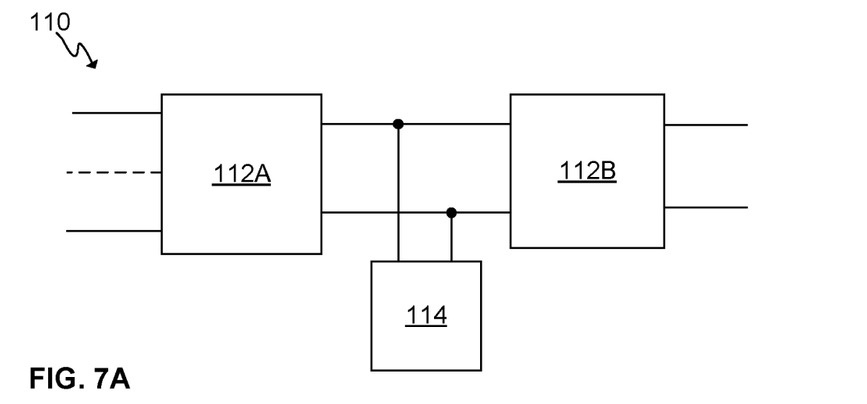
FIGS. 7A and 7B illustrate an electrical energy storage arrangement according to an embodiment of the present invention.
Figure 7B:
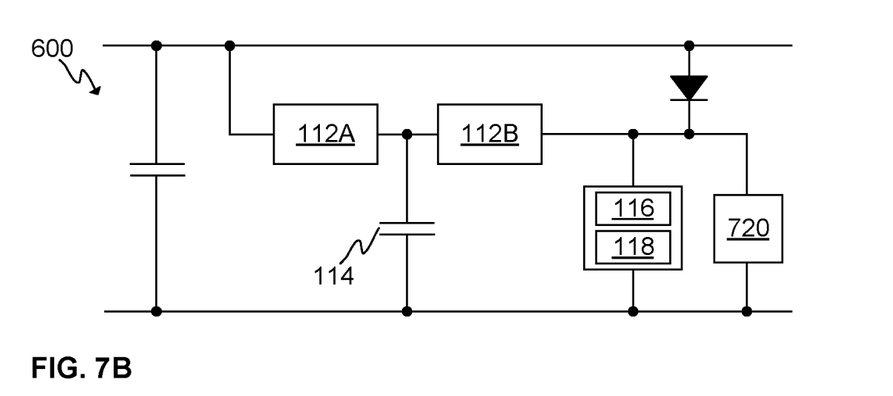

FIGS. 7A and 7B illustrate an electrical energy storage arrangement 110 according to an embodiment of the present invention having the electrical energy storage 114 connected between two electrical converters 112A, 112B, that is, to a converter intermediate circuit. One of the electrical converters 112A, 112B may be a voltage step-up converter 112A for increasing a DC input voltage of said electrical converter 112A or the voltage of the intermediate circuit 600 to appropriate level for the electrical energy storage 114. The voltage step-up converter 112A may, advantageously, be utilized for charging the electrical energy storage 114. According to an embodiment of the present invention, the electrical converter 112A may also be capable of converting AC into DC to charge the electrical energy storage 114 from the electrical mains, i.e., the main electrical power supply 125. The other electrical converter 112B may be a voltage step-down converter 112B for reducing the voltage of the electrical energy storage 114 to appropriate level for the elevator brake 116 or the brake controller 118. According to an embodiment, the appropriate level for the elevator brake 116 or the brake controller 118 may be about 100 V to about 200 V. The voltage step-down converter 112B may advantageously be utilized for discharging the electrical energy storage 114. According to an embodiment of the present invention, the electrical converter 112 may comprise both the voltage step-down 112A and the voltage step-up converter 112B.

According to an embodiment of the present invention, the electrical energy storage arrangement 110 may supply electrical power for the elevator brake 116 or the brake controller 118. According to an embodiment of the present invention, the electrical energy storage arrangement 110 may supply electrical power to the auxiliary electrical power supply 720. According to an embodiment of the present invention, the elevator brake 116 or the brake controller 118 or the auxiliary electrical power supply 720 may be supplied from the intermediate circuit 600 or the input circuit of the electrical drive 105 as shown in FIG. 7B.

According to an embodiment of the present invention, the charging and discharging of the electrical energy storage 114 may occur at different times. According to an embodiment of the present invention, the electrical drive 105 or the electrical converter 112 may be configured such that the charging is not performed when the energy of the electrical energy storage 114 is being discharged such as to deactivate the elevator brake 116 or to energize the auxiliary electrical power supply 720. According to an embodiment of the present invention, the electrical drive 105 or the electrical converter 112 may be configured such that the discharging is not performed when the energy is being stored into the electrical energy storage 114, for example, to increase the voltage level of the electrical energy storage 114 over the voltage level in the normal operating conditions by storing regenerative electrical energy from the electric motor 155.

According to an embodiment of the present invention, the charging and discharging of the electrical energy storage 114 may occur at least partly simultaneously. According to an embodiment of the present invention, regenerative electrical power from the electric motor 155 may be stored into the electrical energy storage 114 comprised in the intermediate circuit 600 electrical drive 105 at the same time as the electrical energy storage 114, such as a capacitor bank, connected between the electrical converters 112A, 112B is being discharged to deactivate the elevator brake 116.

According to an embodiment of the present invention, the voltage step-up converter 112A and the voltage step-down converter 112B may utilize separate or a single inductor as an energy storage element of both of the converters.

Figure 8:
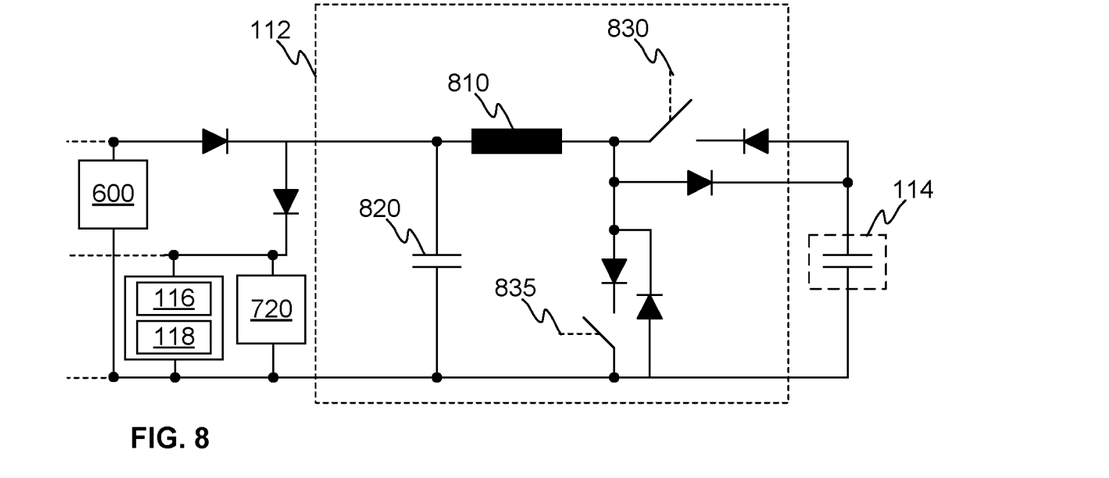
FIG. 8 illustrates an electrical converter of an electrical energy storage arrangement according to an embodiment of the present invention.

FIG. 8 illustrates an electrical converter 112 of the electrical energy storage arrangement 110 according to an embodiment of the present invention utilizing a single inductor 810 as an energy storage element common for both of the electrical converters 112A, 112B in their main power circuits. Capacitor 820 acts as a voltage smoothing output capacitor for the step-down converter 112B. The capacitor comprised in the electrical energy storage 114 acts as a load/output capacitor for the voltage step-up converter 112A and at the same time as a supply for the voltage step-down converter 112B. Control signals 830, 835 for the switches may be generated by a driver circuit or circuits in connection with the switches. According to an embodiment of the present invention, the switches are operated at different times.

Figure 9:
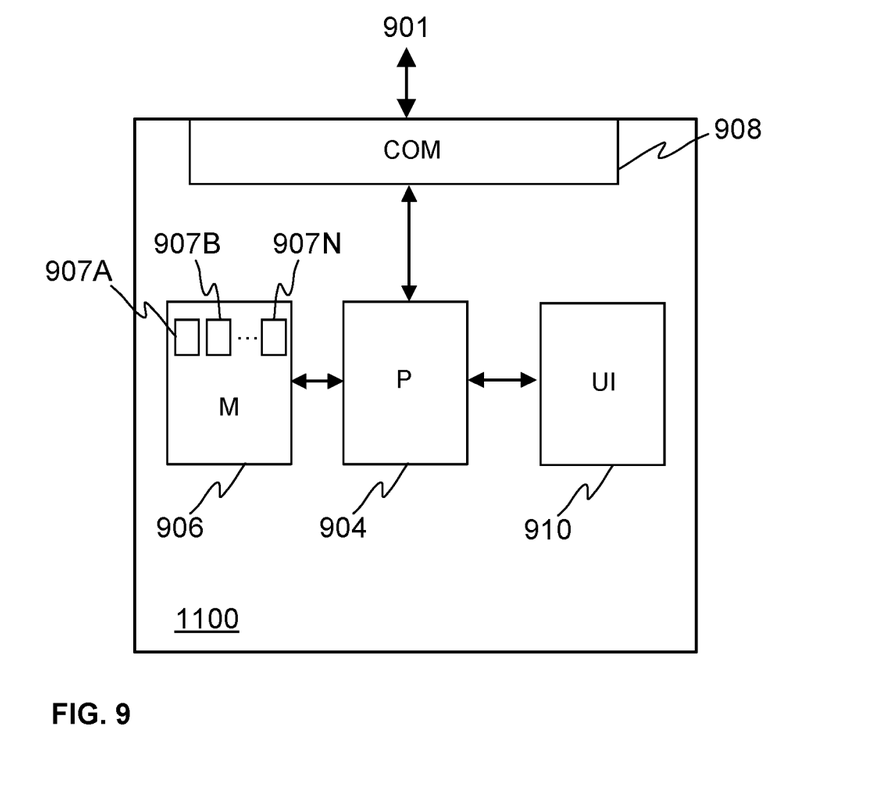
FIG. 9 illustrates schematically an elevator control unit according to an embodiment of the present invention.

FIG. 9 illustrates schematically an elevator control unit 1100 according to an embodiment of the present invention.

External units 901 may be connected to a communication interface 908 of the elevator control unit 1100. External unit 901 may comprise wireless connection or a connection by a wired manner. The communication interface 908 provides interface for communication with external units 901 such as the elevator car 130, the electric motor 155, the doors of the landing floors 160, or the electrical drive 105 to the elevator control unit 1100. There may also be connection to an external system, such as a laptop or a handheld device. There may also be a connection to a database of the elevator 1000 including, for example, operating parameters of the elevator 1000, or to an external database including information used in controlling the operation of the elevator 1000.

The elevator control unit 1100 may comprise one or more processors 904, one or more memories 906 being volatile or non-volatile for storing portions of computer program code 907A-907N and any data values and possibly one or more user interface units 910. The mentioned elements may be communicatively coupled to each other with e.g. an internal bus.

The processor 904 of the elevator control unit 1100 is at least configured to implement at least some method steps as described earlier. The implementation of the method may be achieved by configuring the processor 904 to execute at least some portion of computer program code 907A-907N stored in the memory 906 causing the processor 904, and thus the elevator control unit 1100, to implement one or more method steps as described, for example, in relation to FIG. 2, 3 or 4. The processor 904 is thus arranged to access the memory 906 and retrieve and store any information therefrom and thereto. For sake of clarity, the processor 904 herein refers to any unit suitable for processing information and control the operation of the elevator control unit 1100, among other tasks. The operations may also be implemented with a microcontroller solution with embedded software. Similarly, the memory 906 is not limited to a certain type of memory only, but any memory type suitable for storing the described pieces of information may be applied in the context of the present invention.

The disclosed embodiments of the energy storage arrangement 110 technology may also be used for supplying electrical energy to an electrical drive, such as a drive, operating the elevator car door(s). For this reason, similar energy storage arrangement 110 may be mounted to elevator car also, in connection with the doors of the elevator car. This means that after elevator car 130 has arrived to a landing floor 160, the elevator car 130 and landing doors may be opened during power failure by supplying power to the elevator car door drive from the energy storage arrangement 110.

The present invention also at least decreases the energy storage capacity to do the function using normal electrolytic capacitors and avoid using lead acid batteries that requires regular maintenance and more space with respect the prior art solutions. The system according to the present invention is space efficient and provides quick retrofit installations. Another advantage is an automatic landing function to delight customer in case of sudden power loss. Furthermore, herein is presented an elevator during operation of which there is no stopping between floors, no inconvenient hard stop and no waiting time. Elevator run may be continued in case of mains voltage dip.

The invention claimed is:

1. A method for moving an elevator car to a landing floor in case of a predefined event related to a main electrical power supply of an elevator, the method comprising the steps of:

charging energy from the main electrical power supply into an external electrical energy storage prior to detecting the predefined event related to the main electrical power supply;

detecting the predefined event related to the main electrical power supply;

controlling an operation of an electric motor for moving the elevator car with an electrical drive to decelerate the elevator car and to produce regenerative electrical energy; and selectively utilizing said energy charged from the main electrical power supply into the external electrical energy storage and said produced regenerative electrical energy to maintain an elevator brake in deactivated state, such that the elevator brake is maintained in the deactivated state when detecting the predefined event related to the main electrical power supply, wherein the electrical energy storage is comprised in an intermediate circuit of the electrical drive, wherein the step of controlling comprises the step of after the detection of the predefined event related to the main electrical power supply, applying a torque to the electric motor by the electrical drive to electrically decelerate the elevator car such that the regenerative electrical energy is generated by the electrical motor.

2. The method according to claim 1, wherein the detecting comprises monitoring a voltage of an intermediate circuit of the electrical drive and comparing said voltage to a first threshold value to detect the predefined event.

3. The method according to claim 1, wherein the detecting comprises monitoring a voltage of the main electrical power supply and comparing said voltage to a threshold value to detect the predefined event.

4. The method according to claim 1, wherein the controlling comprises regulating a speed of the elevator car so as to move the elevator car to the landing floor.

5. The method according to claim 1, wherein the step of charging further comprises regulating a voltage of the electrical energy storage to a higher voltage than in normal operating conditions so as to store electrical energy to move the elevator car.

6. The method according to claim 5, comprising regulating the voltage of the electrical energy storage to the higher voltage than in normal operating conditions in a glide mode so as to store electrical energy to move the elevator car.

7. The method according to claim 1, wherein the electrical energy storage for storing electrical energy to move the elevator car is being separate with respect to an energy storage element comprised in the electrical drive, wherein the storing comprises storing at least part of said regenerative electrical energy into said separate electrical energy storage.

8. The method according to claim 7, wherein the storing comprises regulating a voltage of said separate electrical energy storage to a higher voltage than the voltage of the electrical drive in normal operating conditions during at least part of a time period prior to the detecting the predefined event related to the main electrical power supply.

9. A method for moving an elevator car to a landing floor in case of a predefined event related to a main electrical power supply of an elevator, the method comprising the steps of:

detecting the predefined event related to the main electrical power supply;

controlling an operation of an electric motor for moving the elevator car with an electrical drive to decelerate the elevator car and to produce regenerative electrical energy;

storing at least part of said regenerative electrical energy into an intermediate circuit capacitor of the electrical drive; and selectively utilizing energy charged from the main electrical power supply into an external electrical energy storage and said produced regenerative electrical energy to maintain an elevator brake in deactivated state, such that the elevator brake is maintained in the deactivated state when detecting the predefined event related to the main electrical power supply, wherein the electrical energy storage is comprised in an intermediate circuit of the electrical drive, wherein the step of controlling comprises the step of after the detection of the predefined event related to the main electrical power supply, applying a torque to the electric motor by the electrical drive to electrically decelerate the elevator car such that the regenerative electrical energy is generated by the electrical motor.

10. An elevator control unit for moving an elevator car to a landing floor in case of a predefined event related to a main electrical power supply of an elevator, wherein the elevator control unit comprises at least one processor, and at least one memory storing at least one portion of computer program code, wherein the at least one processor is configured to cause the elevator control unit at least to perform the steps of:

charging energy from the main electrical power supply into an external electrical energy storage prior to detecting the predefined event related to the main electrical power supply;

detecting the predefined event related to the main electrical power supply;

controlling an operation of an electric motor for moving the elevator car with an electrical drive to decelerate the elevator car and to produce regenerative electrical energy; and selectively utilizing said energy charged from the main electrical power supply into the external electrical energy storage and said produced regenerative electrical energy to maintain an elevator brake in deactivated state, such that the elevator brake is maintained in the deactivated state when detecting the predefined event related to the main electrical power supply, wherein the electrical energy storage is comprised in an intermediate circuit of the electrical drive, wherein the step of controlling comprises the step of after the detection of the predefined event related to the main electrical power supply, applying a torque to the electric motor by the electrical drive to electrically decelerate the elevator car such that the regenerative electrical energy is generated by the electrical motor.

11. An elevator for moving an elevator car to a landing floor in case of a predefined event related to a main electrical power supply of the elevator, the elevator comprising an electrical energy storage and an elevator control unit configured to:

charge energy from the main electrical power supply into an external electrical energy storage prior to detecting the predefined event related to the main electrical power supply;

detect the predefined event related to the main electrical power supply;

control an operation of an electric motor for moving the elevator car with an electrical drive to decelerate the elevator car and to produce regenerative electrical energy; and selectively utilize said energy charged from the main electrical power supply into the external electrical energy storage and said produced regenerative electrical energy to maintain an elevator brake in deactivated state, such that the elevator brake is maintained in the deactivated state when detecting the predefined event related to the main electrical power supply, wherein the electrical energy storage is comprised in an intermediate circuit of the electrical drive, wherein the elevator control unit, the electrical energy storage and the electrical drive are communicatively coupled to each other, and wherein the elevator control unit is further configured to, after the detection of the predefined event related to the main electrical power supply, apply a torque to the electric motor by the electrical drive to electrically decelerate the elevator car such that the regenerative electrical energy is generated by the electrical motor.

12. The elevator according to claim 11, comprising an electrical converter in electrical connection with the electrical drive and the electrical energy storage, the electrical converter regulating a voltage of the electrical energy storage.

13. The elevator according to claim 12, wherein the electrical converter supplies electrical energy to operate other components of the elevator needed for moving the elevator car to the landing floor in case of the predefined event.

14. The elevator according to claim 12, wherein the electrical converter comprises a voltage step-up converter and a voltage step-down converter, and the electrical converter having a converter intermediate circuit comprising the electrical energy storage.

15. The elevator according to claim 14, wherein the voltage step-up converter and the voltage step-down converter share an inductor as a common energy storage element in their main power circuits.

16. The method according to claim 2, wherein the detecting comprises monitoring a second voltage of the main electrical power supply and comparing said second voltage to a second threshold value to detect the predefined event.

17. The method according to claim 2, wherein said maintaining comprises supplying electrical power from the electrical energy storage comprised in an intermediate circuit of the electrical drive to maintain the elevator brake in the deactivated state.

18. The method according to claim 3, wherein said maintaining comprises supplying electrical power from the electrical energy storage comprised in an intermediate circuit of the electrical drive to maintain the elevator brake in the deactivated state.

19. The method according to claim 1, further comprising supplying power from the external electrical energy storage to an elevator brake for maintaining the elevator brake in the deactivated state after detecting the predefined event related to the main electrical power supply.

20. The method according to claim 9, further comprising supplying power from an intermediate circuit capacitor of an electrical drive to an elevator brake for maintaining the elevator brake in the deactivated state after detecting the predefined event related to the main electrical power supply.

* * * * *